(12) United States Patent
Leibinger

(10) Patent No.: US 10,457,599 B2
(45) Date of Patent: Oct. 29, 2019

(54) METHOD AND APPARATUS FOR PRODUCING CEMENT CLINKER

(71) Applicant: Südbayerisches Portland-Zementwerk Gebr. Wiesböck & Co. GmbH, Rohrdorf (DE)

(72) Inventor: Helmut Leibinger, Rohrdorf (DE)

(73) Assignee: SÜDBAYERISCHES PORTLAND-ZEMENTWERK GEBR. WIESBÖCK & CO. GMBH, Rohrdorf (DE)

( * ) Notice: Subject to any disclaimer, the term of this patent is extended or adjusted under 35 U.S.C. 154(b) by 0 days.

(21) Appl. No.: 15/864,683

(22) Filed: Jan. 8, 2018

(65) Prior Publication Data
US 2018/0127312 A1    May 10, 2018

Related U.S. Application Data

(63) Continuation of application No. PCT/EP2016/065785, filed on Jul. 5, 2016.

(30) Foreign Application Priority Data

Jul. 9, 2015    (EP) .................................... 15176157

(51) Int. Cl.
*C04B 7/47* (2006.01)
*C04B 7/60* (2006.01)
(Continued)

(52) U.S. Cl.
CPC ............ *C04B 7/475* (2013.01); *B01D 53/002* (2013.01); *B01D 53/8628* (2013.01);
(Continued)

(58) Field of Classification Search
CPC ............ B01D 53/56; B01D 2251/2062; B01D 2251/2065; B01D 2255/20707;
(Continued)

(56) References Cited

U.S. PATENT DOCUMENTS

| 4,184,886 A | * | 1/1980 | Ellingen | ................. | B03C 3/014 |
| | | | | | 106/746 |
| 2014/0174324 A1 | * | 6/2014 | Leibinger | ............... | C04B 7/364 |
| | | | | | 106/723 |
| 2016/0347657 A1 | * | 12/2016 | Schuermann | ........... | C04B 7/365 |

FOREIGN PATENT DOCUMENTS

| DE | 2724372 A1 | 12/1978 |
| DE | 102011052561 A1 | 11/2012 |

(Continued)

OTHER PUBLICATIONS

Request for correction/amendment of the text proposed for grant sent from Apr. 1, 2012, in European Application No. 15176157.4 dated Jun. 20, 2017.

(Continued)

*Primary Examiner* — Amber R Orlando
*Assistant Examiner* — Syed T Iqbal
(74) *Attorney, Agent, or Firm* — Norton Rose Fulbright US LLP

(57) ABSTRACT

In methods of and/or plants for manufacturing cement clinker, the amount of chloride bypass exhaust gas 79 can be substantially decreased, when using previously cooled chloride bypass exhaust gas 81 and/or cooled kiln exhaust gas as coolant for the chloride bypass exhaust gas 39 prior to deducting the chloride bypass exhaust gas 39.

10 Claims, 2 Drawing Sheets

(51) Int. Cl.
  *B01D 53/00* (2006.01)
  *B01D 53/86* (2006.01)
  *B01D 53/90* (2006.01)
  *C04B 7/36* (2006.01)
  *C04B 7/44* (2006.01)
  *F27B 7/20* (2006.01)
  *F27D 17/00* (2006.01)

(52) U.S. Cl.
  CPC ......... *B01D 53/8659* (2013.01); *B01D 53/90* (2013.01); *C04B 7/364* (2013.01); *C04B 7/44* (2013.01); *C04B 7/47* (2013.01); *C04B 7/60* (2013.01); *F27B 7/2016* (2013.01); *F27D 17/008* (2013.01); *B01D 2251/2062* (2013.01); *B01D 2251/2065* (2013.01); *B01D 2255/20707* (2013.01); *B01D 2255/20723* (2013.01); *B01D 2255/20769* (2013.01); *B01D 2255/20776* (2013.01); *B01D 2255/50* (2013.01); *B01D 2255/915* (2013.01); *B01D 2257/2025* (2013.01); *B01D 2257/404* (2013.01); *C04B 2290/20* (2013.01); *Y02P 40/123* (2015.11)

(58) Field of Classification Search
  CPC ........... B01D 2255/20723; B01D 2255/20769; B01D 2255/20776; B01D 2255/50; B01D 2255/915; B01D 2257/2025; B01D 2257/404; B01D 53/002; B01D 53/8628; B01D 53/8659; B01D 53/90; C04B 7/364; C04B 7/43; C04B 7/44; C04B 7/60; C04B 7/475; C04B 7/365; C04B 2290/20; C04B 7/47; F27B 2007/2091; F27B 7/20; F27B 7/2016; F27D 17/004; F27D 17/008; Y02P 40/123

See application file for complete search history.

(56) References Cited

FOREIGN PATENT DOCUMENTS

| DE | 102013016701 A1 | 4/2015 |
|----|-----------------|--------|
| EP | 0455301 A2 | 11/1991 |
| EP | 1048629 A1 | 11/2000 |

OTHER PUBLICATIONS

Notice of Intent to Grant in European Application No. 15176157.4 dated Jul. 27, 2017.
Response to Notice of Intent to Grant in European Application No. 15176157.4 dated Jul. 27, 2017, filed Oct. 26, 2017.
Decision to grant a European patent in European Application No. 15176157.4 dated Dec. 21, 2017.
Response to Office Action dated Oct. 4, 2016 in European Application No. 15176157.4 filed Oct. 10, 2016.
Office Action dated Oct. 4, 2016 in European Application No. 15176157.4.
European Search Report and Search Opinion in European Application No. 15176157.4, dated Jan. 14, 2016.
International Search Report in International Application No. PCT/EP2016/065785 dated Sep. 13, 2016.
Ebbe et al., "New Reasons for Installing a Chloride By-Pass. Interaction Between Chloride and Sulphur" 2008 *IEEE Cement Industry Technical Conference Record*, 2008, 18-22 Miami FL, 195-209.
Harder, Joachim. "Der Herstellungsprozess," *ZKG-Handbuch Zementanlagenbau 2013/2014*, Bauverlag Gütersloh, 2013. See English Translation of Graph key/labels on first page of submission (numbered p. 20).
Sutou et al. "Ein neues Chlorid-Bypass-System mit stabiler Ofenführung and Staubverwertung," *ZKG International* 2001; 54(3): 121-128. English Text (second paragraph of first page and right-hand of columns of subsequent pages).

\* cited by examiner

METHOD AND APPARATUS FOR PRODUCING CEMENT CLINKER

PRIORITY CLAIM

This application is a continuation of pending International Application No. PCT/EP2016/065785 filed on Jul. 5, 2016, which designates the United States and claims priority from European Application No. 15176157.4 filed on Jul. 9, 2015, both of which applications are incorporated by reference.

BACKGROUND OF THE INVENTION

1. Field of the Invention

The invention relates to the field of cement clinker manufacturing, in particular to a method for removal of chlorine from the clinker process. First, a chloride bypass gas flow is provided by drawing of a fraction of a main exhaust gas flow. Said bypass gas flow is cooled in a first cooling step by mixing it with a cooling gas. Subsequent deducting removes the chlorine from the chloride bypass gas flow. The remaining heat may be recuperated by cooling the dedusted chloride bypass gas flow in a second cooling step by providing a thermal contact of the dedusted chloride bypass gas flow with at least one heat carrier fluid which is in turn heated.

2. Description of Relevant Art

For manufacturing cement clinker, which is usually briefly referred to as 'clinker', raw meal is calcined and sintered in a cement clinker kiln (usually briefly 'kiln') and thereby converted into clinker. To enhance energy efficiency, the raw meal is pre-warmed by contacting it with the exhaust gas of the kiln in a so called preheater. A summary of the clinker process is provided by "*Der Herstellungsprozess*", Dr. Joachim Harder published in ZKG-Handbuch Zementanlagenbau 2013/2014, Bauverlag Gütersloh, the disclosure of which is incorporated herein as if fully disclosed.

Chlorine is a serious concern in clinker production, as it increases fuel consumption and corrosion. Chlorine is embedded in the crystal lattice of the clay used for raw meal production and it is present in the fuel and thus provided to the kiln. The chlorine introduced into to the kiln by organic substances forms hydrochloride acid (HCl). This HCl is transported with the flue gas to the preheater, where it is absorbed by free lime (CaO) and thus forms Calcium Chloride ($CaCl_2$). This $CaCl_2$ reenters the kiln with the raw meal. Regardless of its origin chlorine is thus present in the liquid phase in the transition and burning zone of the kiln. There, the chlorine forms salts, in particular potassium chloride (KCl), sodium chloride (NaCl). These salts evaporate and leave the kiln with the flue gas. In the preheater these chlorides condense on the raw meal. Thus, the chlorides circulate between the kiln and the preheater and accumulate. Further, the chlorides condense on the preheater itself and reduce the flow area resulting in preheater clogging. Other flue gas components that evaporate in the kiln and condense on the raw meal recirculate in a similar manner. For reducing this internal circulations a bypass system, the so called chloride bypass is known. These internal circulations and chloride bypass systems have been subject of numerous publications, e.g. "*Numerous Reasons for installing a Chloride By-Pass. Interaction between Chloride and Sulphur*." (Ebbe Jøns, et al. in Cement Industry Technical Conference Record, 2008 IEEE, p. 195ff) or "*Ein neues Chlorid-Bypass-System mit stabiler Ofenführung and Staubverwertung*" (Sutou et al ZKG Int, Vol. 54, No. 3, 2001, p. 121ff), to name only two.

A chloride bypass draws of a fraction (typically 3% to 10%) of the flue gases before they are significantly cooled. In Arabian countries the 'fraction' is up to 100%. Next, the fraction is cooled below the condensation temperature of the chlorides by mixing it with fresh air. The chlorides condense on the dust carried by the flue gases and can be removed by filtering the cooled fraction. The filtered gas is subjected to a waste gas treatment and released. As suggested in the German Patent DE 10 2011 052 561 (the disclosure of which is incorporated herein as if fully disclosed), the filtered gas may alternatively be further used for heating a water boiler and subsequently provided to the hot end of a clinker cooler as cooling gas. There, chloride bypass exhaust gas is heated when cooling the clinker in turn. A part of the heated cooling gas may be provided via a tertiary air duct to a calciner, the other part is provided to the kiln as secondary air.

U.S. Pat. No. 7,947,242 B2 addresses the problem of chlorine and sulfur enrichment in the clinker process by drawing of chloride bypass gas from the kiln ('s raw meal) inlet, separating the coarser dust by a classifier and removal of the fine dust particles by a wet dust collector. Sulfur dioxide in the combustion gas and thus the chloride bypass gas is thereby removed, as the sulfur dioxide (SO2) reacts with calcium hydroxide ($Ca(OH)_2$) being generated by a reaction of the calcium oxide (CaO) of the fine particles with water. The such obtained gypsum is added to the clinker when milling. A similar solution is suggested by DE4442563A1.

DE 27 24 372 A1 relates to a clinker manufacturing and starts from the observation that prior art bypass systems cool the hot bypass gasses down by water injection cooling and by mixing the bypass gas with air having ambient temperature. The corresponding humidity of the bypass gas is considered to impose a lower limit on the dust concentration in the bypass gas. To reduce this limit DE 27 24 372 A1 suggests to mix the bypass gas prior to dedusting it with a previously cooled exhaust gas from the main exhaust gas stream, being cooler and having a higher dew point.

US 2014/0366499 A relates to a chloride bypass device and suggests cooling kiln exhaust gas by mixing said exhaust gas with cooling air to thereby cool the bypass gas to temperatures enabling dedusting of the chloride bypass gas by bag filters, which is typically about 200° C.

EP 1 048 629 A1 suggests an apparatus and a method for bypassing kiln exhaust gas, wherein part of exhaust gas generated by the operation of a kiln is extracted through a probe and mixed with cooling air to thereby cool it down to a temperature of 400 to 600° C. Subsequently the gas stream is mixed with further cooling air to cool it down to secondary cooling temperature of 300 to 400° C. The coarse powder is separated from the stream using a cyclone and returned to the kiln system. The exhaust gas air mixture containing the fine powder is finally cooled to a temperature of 100 to 200° C. with cooling air from a further cooling fan in a further cooler and the fine powder dust is collected with a dust collector.

DE 10 2013 016 701 A1 and EP 0 455 301 A2 relate to further processes for processing bypass gas streams.

SUMMARY OF THE INVENTION

The problem to be solved by the invention and thus by its embodiments is to optimize the chloride bypass of the cement clinker process.

The invention is based on the observation that the object of providing tertiary air to the calciner and secondary air to the kiln is to provide oxygen required for calcination and combustion to the process. However, the chloride bypass exhaust gas has—compared to fresh air—a significantly reduced oxygen content. Thus providing chloride bypass exhaust gas to the clinker cooler has the disadvantage that the oxygen content of the secondary and tertiary air is reduced. Alternatively, the chloride bypass exhaust may be released with the main exhaust gas flow, but as the bypass exhaust gas is a mixture of air and flue gases it increases the oxygen content of the released exhaust gas, making it difficult if not impossible to comply with the governmental emission limits. Further, the volume per amount of time that must be subjected to waste gas treatment is significantly enhanced by cooling the bypass gas by mixing with fresh air. This augmented volume causes significant costs, because the dimensioning of the exhaust gas treatment means has to be increased accordingly. Another disadvantage is that the mixing step with fresh air at ambient temperature significantly reduces the exergy of the chloride bypass gas and thus the amount of energy that can be recuperated and provided to heat sinks in the cement clinker manufacturing line.

A central ideal of the invention is to replace the air used for cooling the chloride bypass exhaust gas by previously cooled exhaust gas drawn off at the cold end of the chloride bypass and/or at the cold end of the main kiln exhaust gas treatment. The amount of exhaust gas can be substantially decreased, when using previously cooled chloride bypass exhaust gas and/or cooled kiln exhaust gas as coolant for the chloride bypass exhaust (instead of air) gas prior to deducting the chloride bypass exhaust gas.

According to the invention, a flow of chloride bypass gas (briefly 'bypass gas') is provided by drawing of at least a fraction (e.g. 1% to 15%, preferably 3% to 10%) of the main exhaust gas flow, i.e. from the exhaust gas flow provided from the kiln to the preheater, be it directly or via a calciner. Preferably, the bypass gas is drawn off, before it is significantly cooled down, e.g. before it is contacted with the raw meal in the preheater. Subsequently, the bypass gas may be cooled down in a first cooling step to a first temperature ($T_1$). At this first temperature $T_1$ condensation of the chlorides or of other components that have to be removed from the bypass gas may take place and the chlorides may condense on the dust particles. Thus, deducting prior to the first cooling step should be omitted or at least incomplete to such extend that a sufficient amount of dust remains in the bypass gas to provide condensation nuclei. Cooling can be obtained by mixing the bypass gas with a cooling gas, i.e. a gas being colder than the bypass gas prior to the first cooling step. Mixing can be obtained in a mixing chamber which may be positioned downstream of the chloride bypass intake at which said fraction of the kiln exhaust gas is drawn off.

Later, the cooled bypass gas may be dedusted, i.e. clinker dust, raw meal dust or other particles being transported by the bypass gas flow are preferably at least partially removed from the bypass gas, e.g. by dust removal means, preferably a hot gas filter. Hot gas filtering methods as such are known, electrostatic filters may be used as well as ceramic filters or the like. The such removed dust is enriched with chlorine and eventually heavy metals and should not be provided to the kiln or a calciner again. The removed dust may for example at least to some extend be added to the clinker line downstream the kiln, e.g. when milling the clinker.

The dedusted bypass gas may be subjected to a second cooling step by thermally contacting the bypass gas with at least one heat carrier fluid, which is heated in turn. After the second cooling step the bypass gas has a temperature $T_2$, which will be discussed later. The heat carrier fluid may be a gas and/or liquid. There may be a phase transition from liquid to gaseous due to heating of the heat carrier liquid with the bypass gas. The heat carrier fluid may be e.g. water which is pressurized by said heat exchanger to be expanded in turbine to thereby make mechanical energy available. Alternatively, the heat carrier fluid may be an organic fluid, being highly stable even at high temperatures, typically referred to a thermal oil. The latter is particular reasonable in case the heat shall be trans-ported and/or used to heat a further fluid in a second heat exchanger. Other heat carrier fluids may be used as well, so called thermos-oils, molten salts, CO2 reducing gases, etc.

Typically, such thermal contact may be provided by use of a heat exchanger. In the latter case, the dedusted bypass gas is provided to the hot inlet of the heat exchanger and drawn off at its cold outlet. In turn the heat carrier fluid is provided to the cold inlet of the heat exchanger and drawn off from its hot outlet. The thereby recuperated heat may be used as process heat, for example (at least in part) for drying or preheating raw meal or low grade fuels. Alternatively it may be supplied to a heat engine for conversion into mechanical energy, e.g. to a steam turbine. The mechanical energy may be converted (at least in part) into electricity using an electric generator.

Preferably, at least a fraction of the bypass gas obtained by the second cooling step may be used as coolant in the first cooling step. In other words, at least a part of the bypass gas is recirculated. This can be obtained by installing a conduit connecting the cold outlet of the heat exchanger with an inlet of the mixing chamber.

Accordingly, the bypass exhaust gas flow, i.e. the amount of gas leaving the chloride bypass is significantly reduced. In a stationary state of the clinker process the bypass exhaust gas flow (mass per time) is the same as the flow being drawn off from the main exhaust gas flow (neglecting the mass and volume of the dust being removed). Further, the bypass exhaust gas is not enriched with oxygen and can be released, if required after further flue gas treatment. Alternatively, the bypass exhaust gas may as well be provided to a coolant inlet of a clinker cooler and would thus be subjected to the normal flue gas treatment. The bypass exhaust gas is already dedusted and could be mixed with the main exhaust gas flow, preferably after the main exhaust gas flow has been dedusted as well.

Additionally or alternatively the cooling gas can be drawn off the main exhaust gas flow downstream the preheater, preferably after a deducting step and/or an additional cooling step. The effect is similar, no additional oxygen is introduced into the exhaust(s), and the overall amount of exhaust gas is reduced.

Preferably, the bypass gas is subjected to a selective catalytic reduction (SCR) prior to the second cooling step. This step is referred to as SCR step. At this stage of the process, i.e. after the first cooling step, the temperature $T_1$ of the bypass gas is still sufficient for the SCR. Further, during the SCR, the temperature of the bypass gas rises again and the additional thermal energy can be transferred to the heat carrier fluid and thereby made available as process heat in the later second cooling step.

Only to avoid misunderstandings, SCR is a method for converting nitrogen oxides ($NO_x$) into Nitrogen ($N_2$) and water ($H_2O$), by adding a reductant (e.g. ammonia ($NH_3$), aqueous ammonia, ammonia hydroxide ($NH_4OH$), etc.) to the bypass gas and subjecting the such obtained bypass gas to a catalyst. Typical catalysts are titanium oxide and oxides of base metals (such as vanadium, molybdenum and tungsten), zeolites or various precious metals (or combinations thereof).

For example, the SCR-step may take place just before the second cooling step. In this example the catalyst can be positioned between the dust removal means and a heat exchanger for cooling the bypass gas in the second cooling step. The reductant may be added to the bypass gas upstream of the catalyst, i.e. before the bypass gas contacts the catalyst. In a particularly preferred embodiment the catalyst is embedded in the dust removal means. For example the dedusting means may comprise a ceramic filter which may be used as carrier for the catalytic material. The catalyst(s) may be embedded in the ceramic filter. A further advantage of an SCR step is that the concentration of dioxins, volatile organic substances so called VOCs is reduced and accordingly their emission by the cement clinker line is reduced as well.

In the first cooling step the bypass gas may be cooled preferably to about 400° C.±50K. At these temperatures the chlorides condense quickly and can be separated from the gas by the dedusting step. Further, this temperature regime is known to be perfect for the optional SCR and the exergy of the bypass gas that can be transferred in the second cooling step is maximized. In case the SCR-step is omitted the temperature $T_1$ of the bypass gas after the first cooling step can be even higher (e.g. 450-650° C.) to further enhance the exergy, as the boiling temperatures of KCl, NaCl and $CaCl_2$ are 1420° C., 1413° C., 1935° C., respectively. But at higher temperatures the time to obtain sufficient condensation is longer, because the dust particles which serve as condensation nuclei cool down slower than the gas itself. Further, heat resistivity of the filter (=dust removal means) for the deducting step must be considered, i.e. the filter must be able to withstand the corresponding temperature $T_1$. In practice, the dust removal means likely limit the maximum of the temperature $T_1$.

In the second cooling step bypass gas may be cooled down to approximately 120° C.±50K. Above 100° C. the water in the bypass gas does not condense and no aqueous acids are present which support corrosion of the heat exchanger or by-pass gas conduits. Further this temperature regime is comparatively simple to handle.

Between the first and second cooling step, the bypass gas is preferably subjected to a catalyst for oxidizing hydrocarbons (herein after briefly 'oxi-cat'). The oxi-cat is preferably positioned directly upstream of the heat exchanger for performing the second cooling step.

BRIEF DESCRIPTION OF THE DRAWINGS

In the following, the invention will be described by way of example, without limitation of the general inventive concept, on examples of embodiment and with reference to the drawings.

Figure 1:
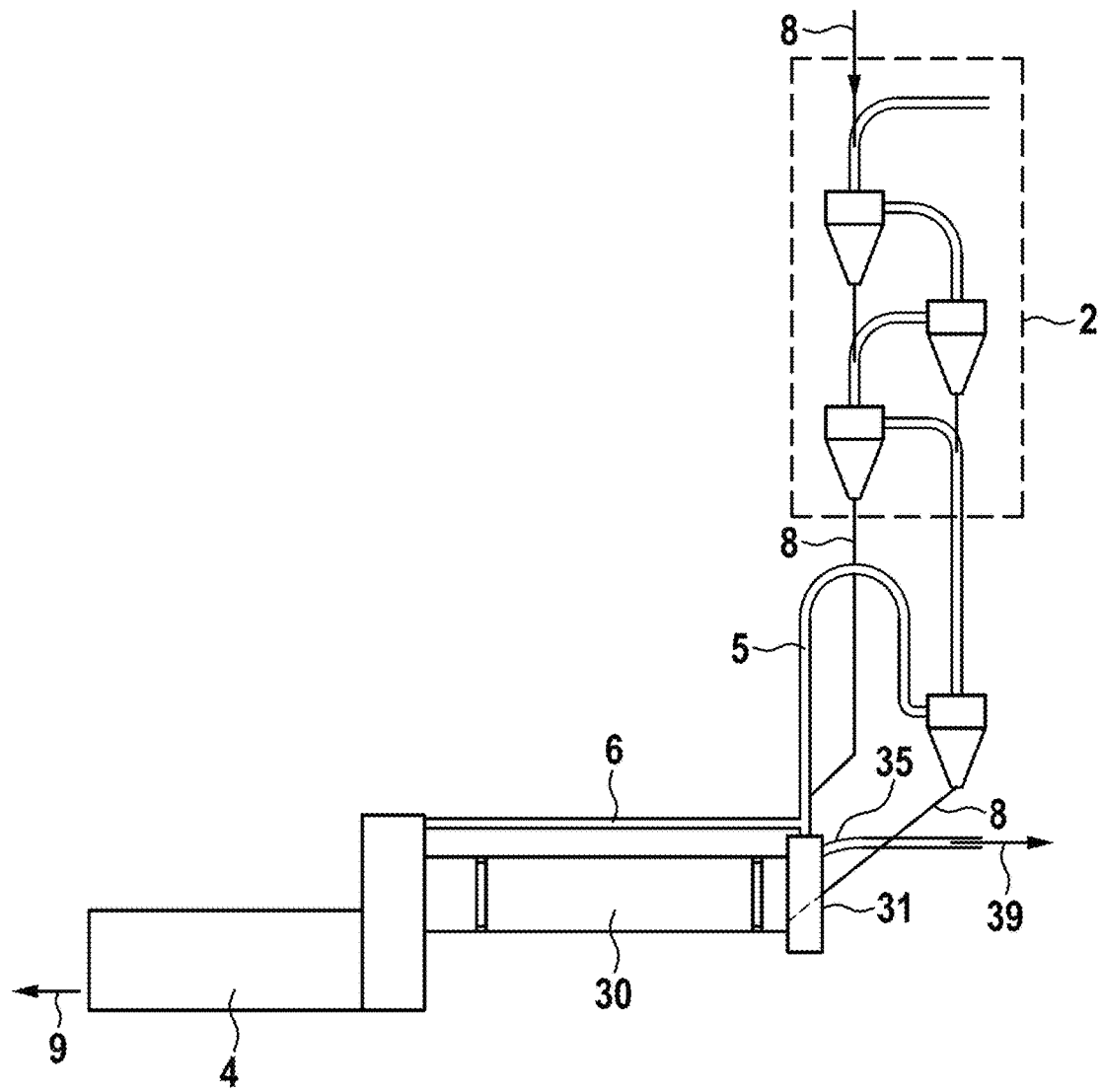
FIG. 1 shows a schematic sketch of a cement clinker line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The cement clinker line in FIG. 1 comprises as usual a preheater 2, a kiln 30 and a clinker cooler 4. Raw meal 8 is preheated in the preheater 2 and provided to the kiln inlet 31. In the kiln 30 the raw meal 8 is calcined and sintered to clinker. The clinker 9 is discharged on the clinker cooler 4 and can be further processed after being cooled down (indicated by an arrow, symbolizing the clinker 9), e.g. by milling. Hot air from the clinker cooler 4 is provided to the kiln 30 as secondary air and leaves the kiln 30 at its inlet 31 as flue or exhaust gas. Said kiln exhaust gas is dust loaden and hot (~typically 1500° C. to 2000° C.). The main amount of the kiln exhaust gas is provided to the preheater 2 for pre-warming the raw meal 8. Optionally a calciner 5 may be installed between the preheater 2 and the kiln 30. In that case the raw meal 8 is provided from the preheater 2 to the calciner 5 and from the calciner 5 to the kiln 30. At least a part of the kiln exhaust gas may be provided to the preheater via the calciner 5. Further, tertiary air may be provided from the clinker cooler 4 to the calciner 5.

At least fraction, typically about 3% to 10% of the kiln exhaust gas is drawn of via a chloride bypass intake 35. From said chloride bypass intake 35, bypass gas 39 flows to a first inlet 41 of a mixing chamber 40 for mixing the bypass gas 39 with a cooling gas in a first cooling step. The cooling gas may be provided to the mixing chamber by a second inlet 42. The cooled bypass gas 49 leaves the mixing chamber 40 via its outlet 43 and flows to a dust removal means 60 for filtering the cooled bypass gas 49. The filtered bypass gas 69 exits the dust removal means 60 via outlet 62 and is provided to the warm inlet 71 of a heat exchanger 70. In the heat exchanger 70 the filtered bypass gas 69 is subjected to a second cooling step by thermally contacting the bypass gas with a heat carrier fluid as coolant being provided to the heat exchanger 70 via a cold inlet 73. Warmed heat carrier fluid is drawn off the heat exchanger 70 via a warm outlet 74. The heat carrier fluid may be water, in particular if the heat shall be converted into mechanical energy by expanding steam in a turbine. Other heat carrier fluids may be used as well, e.g. thermal oils as set out above. The cooled bypass gas 79 is referred to as bypass exhaust gas 79, but only to clearly distinguish the bypass gas after the second cooling step from the "cooled bypass gas" obtained after the first cooling step. Said bypass exhaust gas 79 may be split in two portions, for example by two ventilation means as indicated by reference numeral 20 and 26: a first portion 81 of the bypass exhaust gas 79 is provided via a conduit 80 to the second inlet 42 of the mixing chamber 40. Alternatively or additionally, the first portion 81 (or at least a part it) may be drawn off by the ventilation means 20 downstream of the ventilation means 26, as indicated by a dashed line. A further alternative is to draw of a fraction of the main kiln exhaust gas flow, e.g. downstream the preheater; preferably, downstream of a dedusting step. Said fraction may as well be provided to the mixing chamber.

Figure 2:
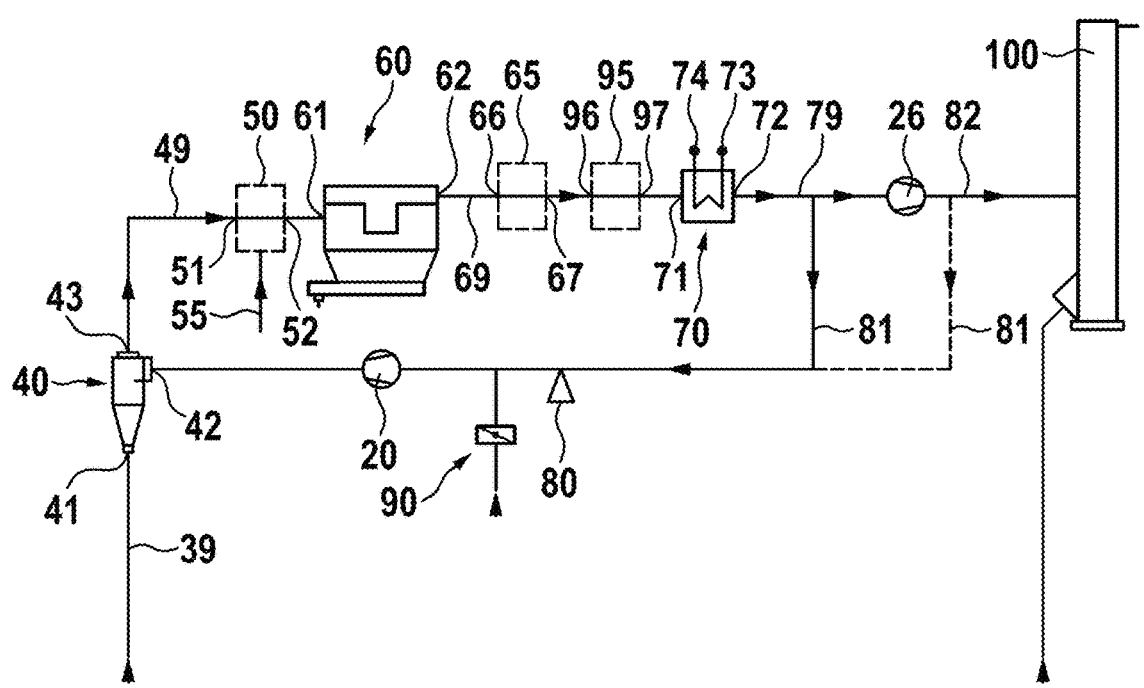
FIG. 2 shows a schematic flow diagram of a chloride bypass system.

The remaining second portion 82 of the bypass exhaust gas 79 is drawn off and may be provided to an exhaust 100 as depicted. Alternatively the second portion 82 may be provided to a clinker cooler as cooling agent or to raw meal pre-warming means. The second portion may be provided to an exhaust 100, to a raw meal mill for drying the raw meal, to the clinker cooler 4 or any other suited place. As apparent from FIG. 2, no oxygen rich air is introduced into the chloride bypass. Thus, the amount of bypass exhaust gas is significantly reduced. Further, as the bypass exhaust gas 79 has the same low oxygen concentration as the kiln exhaust gas it may be released in the same way, compliant with the governmental emission limits. Fresh air is only required for emergency cooling. The fresh air may be provided via a fresh air intake 90 of the conduit 80.

Optionally a reductant injector 50 (shown with dashed lines) may be provided, e.g. between the mixing chamber and the dust removal means 60. A catalyst for catalytic denitrification may be positioned in the flow path as well, e.g. directly downstream the reductant injector 50. The catalyst may be embedded in at least one filter element of the dust removal means 60. For example, the dust removal means 60 may comprise at least one ceramic or sintered filter element into which said at least one catalyst is embedded.

In particular in case no catalyst is embedded in the in the dust removal means, a catalyst unit 65 (shown with dashed lines) may be positioned preferably in the flow path of the dedusted bypass gas 69, as the temperature $T_1$ of the bypass gas prior to the second cooling step is typically in the range required for a SCR-process. As well the reductant injector 50 may be positioned in the flow path of the dedusted bypass gas 69 (different from the depicted position). Further, the bypass gas is less abrasive after dust removal and accordingly the life span of the catalyst unit is augmented.

A further option is a further catalyst unit 95, a so called oxi-cat for oxidizing hydrocarbons. Said further catalyst 95 may arranged between the deducting means 60 and the heat exchanger 70. Particularly preferred the further catalyst 95 may be positioned downstream the SCR catalyst unit 65.

It will be appreciated to those skilled in the art having the benefit of this disclosure that this invention is believed to provide an improved chloride bypass process for a cement clinker line and as well an accordingly improved cement clinker line. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 2 preheater
3 kiln
4 clinker cooler
5 calciner
6 tertiary air duct
7 to waste gas processing
8 raw meal
9 clinker
20 ventilation means
26 ventilation means
30 kiln
31 kiln inlet (raw meal inlet and flue gas outlet)
32 cement clinker
35 chloride bypass intake
39 chloride bypass gas
40 mixing chamber
41 first inlet of mixing chamber
42 second inlet of mixing chamber
43 outlet of mixing chamber
49 cooled bypass gas/bypass gas after first cooling step
50 reductant injector
51 bypass gas inlet of reductant injector
53 reductant inlet of reductant injector
52 outlet of reductant injector
59 bypass gas with reductant
60 dust removal means
61 inlet of dust removal means
62 outlet of dust removal means
65 catalyst unit
66 inlet of catalyst unit
67 outlet of catalyst unit
69 deducted bypass gas
70 heat exchanger
71 warm inlet of heat exchanger
72 cold outlet of heat exchanger
73 cold inlet of heat exchanger
74 warm outlet of heat exchanger
79 bypass gas after second cooling step/chloride bypass exhaust gas
80 conduit
81 fraction of bypass gas provided to second inlet of mixing chamber
82 fraction of bypass gas provided to exhaust
90 fresh air intake
95 further catalyst unit/oxi-cat
96 inlet of further catalyst unit
97 outlet of further catalyst unit
100 exhaust

The invention claimed is:

1. Method for chloride bypass gas treatment, comprising:
providing a chloride bypass gas flow by drawing at least a fraction of a main exhaust gas flow from a kiln,
a first cooling step of cooling the chloride bypass gas flow by mixing it with a cooling gas to form a mixed chloride bypass gas flow,
dedusting the mixed chloride bypass gas flow, and
a second cooling step of cooling the dedusted-and-mixed chloride bypass gas flow by bringing the dedusted mixed chloride bypass gas flow into thermal communication with at least one heat carrier fluid which is heated as a result of the thermal communication with the dedusted mixed chloride bypass gas flow,
wherein at least a part of the cooled dedusted-and-mixed chloride bypass gas flow obtained after the second cooling step is used as cooling gas in the first cooling step.

2. A method of claim 1, further comprising:
providing a reductant to the chloride bypass gas flow before the second cooling step.

3. A method of claim 2, where the reductant is provided to the chloride bypass gas flow before beginning the dedusting.

4. A method of claim 2, further comprising:
after providing the reductant and before the second cooling step, contacting the chloride bypass gas flow with at least one catalyst for selective catalytic reduction of nitrogen oxide.

5. A method of claim 4, wherein the dedusting step comprises providing at least a part of the chloride bypass gas flow to a filter into which at least one catalyst for selective catalytic reduction of nitrogen oxide (NOx) is incorporated and/or embedded.

6. A method of claim 1, wherein the chloride bypass gas is cooled to a temperature $T_1$ between 350° C. and 450° C. in the first cooling step.

7. A method of claim 1, wherein the chloride bypass gas is cooled to a temperature $T_2$ between 70° C. and 170° C. in the second cooling step.

8. A method of claim 1, wherein
the thermal communication of the second cooling step is performed in at least one heat exchanger,
the dedusted-and-mixed chloride bypass gas flow is provided to a warm inlet of the heat exchanger and drawn off at a cold outlet of the heat exchanger, and
the heat carrier fluid is provided to a cold inlet of the heat exchanger and drawn off at a warm outlet of the heat exchanger.

9. A method of claim 1, wherein at least a part of the heat provided to the heat carrier fluid is used as process heat in the clinker process and/or converted into electric energy.

10. A method of claim 1, wherein, after the second cooling step, the at least a part of the cooled dedusted-and-mixed chloride bypass gas flow is drawn off from an outlet of a heat exchanger associated the second cooling step and recirculated via a conduit to at least one mixing chamber associated with the first cooling step to thereby provide the cooling gas in the first cooling step.

* * * * *

UNITED STATES PATENT AND TRADEMARK OFFICE
CERTIFICATE OF CORRECTION

PATENT NO. : 10,457,599 B2 Page 1 of 1
APPLICATION NO. : 15/864683
DATED : October 22, 2019
INVENTOR(S) : Helmut Leibinger It is certified that error appears in the above-identified patent and that said Letters Patent is hereby corrected as shown below:

On the Title Page

Item (57), Abstract, Line 6:
Delete "deducting" and replace with -- dedusting --.

In the Claims

Claim 10, Column 9, Line 27:
Delete "associated the" and replace with -- associated with the --.

Signed and Sealed this
Seventh Day of April, 2020

Andrei Iancu
*Director of the United States Patent and Trademark Office*